(12) United States Patent
Chen et al.

(10) Patent No.: US 8,045,273 B2
(45) Date of Patent: Oct. 25, 2011

(54) LIGHT PROJECTION APPARATUS AND LIGHT-MIXING MODULE THEREOF

(75) Inventors: Sung-Nan Chen, Hsinchu (TW); Chao-Shun Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 148 days.

(21) Appl. No.: 12/326,302

(22) Filed: Dec. 2, 2008

(65) Prior Publication Data

US 2009/0153977 A1  Jun. 18, 2009

(30) Foreign Application Priority Data

Dec. 14, 2007  (TW) ................................ 96147826 A (51) Int. Cl.
 G02B 27/10 (2006.01)
 G02B 27/14 (2006.01)
 G03B 21/00 (2006.01)
(52) U.S. Cl. ........... 359/634; 359/618; 359/638; 353/33
(58) Field of Classification Search .................. 359/618, 359/629–640; 347/238, 239, 241–244, 232; 353/33
See application file for complete search history.

(56) References Cited

U.S. PATENT DOCUMENTS

| | | | | |
|---|---|---|---|---|
| 3,794,407 A | * | 2/1974 | Nishimura | 359/634 |
| 4,505,264 A | * | 3/1985 | Tremblay | 359/834 |
| 5,767,887 A | * | 6/1998 | Warner et al. | 347/232 |
| 5,796,526 A | * | 8/1998 | Anderson | 359/671 |
| 6,762,785 B2 | * | 7/2004 | Roddy et al. | 347/239 |
| 7,167,315 B2 | * | 1/2007 | Watson et al. | 359/634 |
| 7,212,344 B2 | | 5/2007 | Keuper et al. | |

OTHER PUBLICATIONS

Hecht, Eugene. Optics. Reading, MA: Addison-Wesley, 1998. pp. 109-123. Print.*

* cited by examiner

Primary Examiner — Ricky Mack
Assistant Examiner — Zachary Wilkes
(74) Attorney, Agent, or Firm — Muncy, Geissler, Olds & Lowe, PLLC (57) ABSTRACT

A projection apparatus includes a first, a second and a third light sources, a first reflective element, a first and a second dichroic mirrors, a light-homogenizing element, a light valve and a projection lens. The first reflective element is configured to reflect the first light beam, and the first dichroic mirror is configured to reflect the second light beam and to transmit the first light beam transmitted from the first reflective element. The second dichroic mirror is configured to reflect the first and the second light beams transmitted from the first dichroic mirror and to transmit the third light beam. The light-homogenizing element is used for homogenizing the combined light beam, and the light valve is used for modulating the combined light beam to form an image beam. The projection lens is used for receiving and then projecting the image beam.

12 Claims, 7 Drawing Sheets

LIGHT PROJECTION APPARATUS AND LIGHT-MIXING MODULE THEREOF

CROSS REFERENCE TO RELATED APPLICATION

This application claims priority of application No. 096147826 filed in Taiwan R.O.C on Dec. 14, 2007 under 35 U.S.C. §119; the entire contents of which are hereby incorporated by reference.

BACKGROUND OF THE INVENTION

1. Field of the Invention

The invention relates to a light projection apparatus and its light-mixing module, and more particularly, to a light projection apparatus and its light-mixing module capable of mixing different light beams having their respective colors.

2. Description of the Related Art

Figure 1:
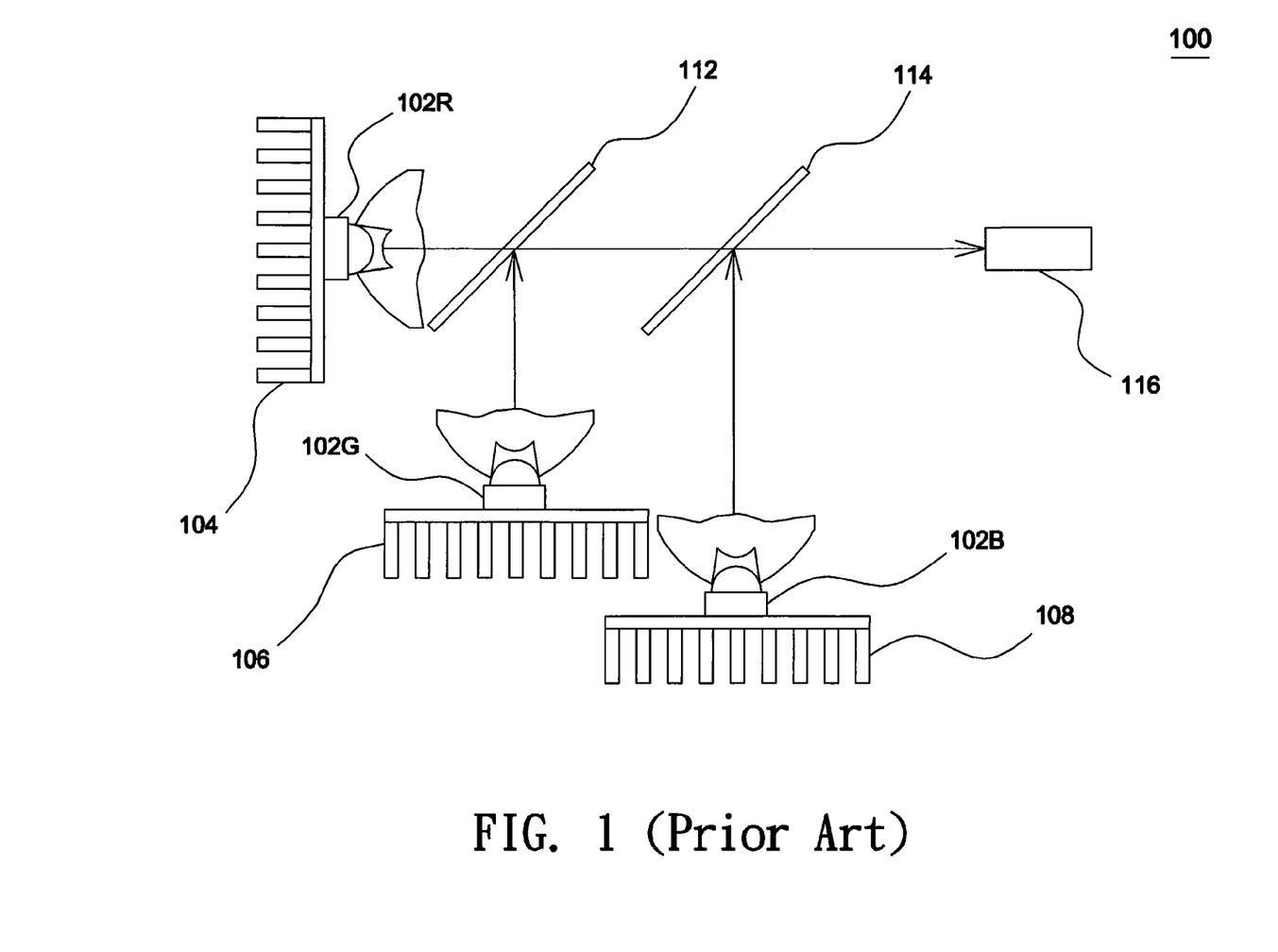
FIG. 1 shows a schematic diagram illustrating a conventional illumination system.

FIG. 1 shows a schematic diagram illustrating a conventional illumination system that uses multiple light-emitting diodes as light sources. Referring to FIG. 1, a red light-emitting diode (LED) 102R, a green LED 102G, and a blue LED 102B scatter in an illumination system 100 and are respectively provided on a first heat-dissipating element 104, a second heat-dissipating element 106, and a third heat-dissipating element 108. The emitting light of the red LED 102R passes through a dichroic mirror 112 and a dichroic mirror 114 in succession and then enters a light integrator rod 116. The emitting light of the green LED 102G is reflected by the dichroic mirror 112, passes through the dichroic mirror 114, and then enters the light integrator rod 116. The emitting light of the blue LED 102B is reflected by the dichroic mirror 114 and then enters the light integrator rod 116. Though the above optical configuration may achieve the effect of mixing different light beams having their respective colors and then outputting a combined light beam, the three separate heat-dissipating elements that scatter in the illumination system 100 may excessively widen the horizontal span of the illumination system 100 and expand the occupied space of a projection apparatus as a result.

Figure 2:
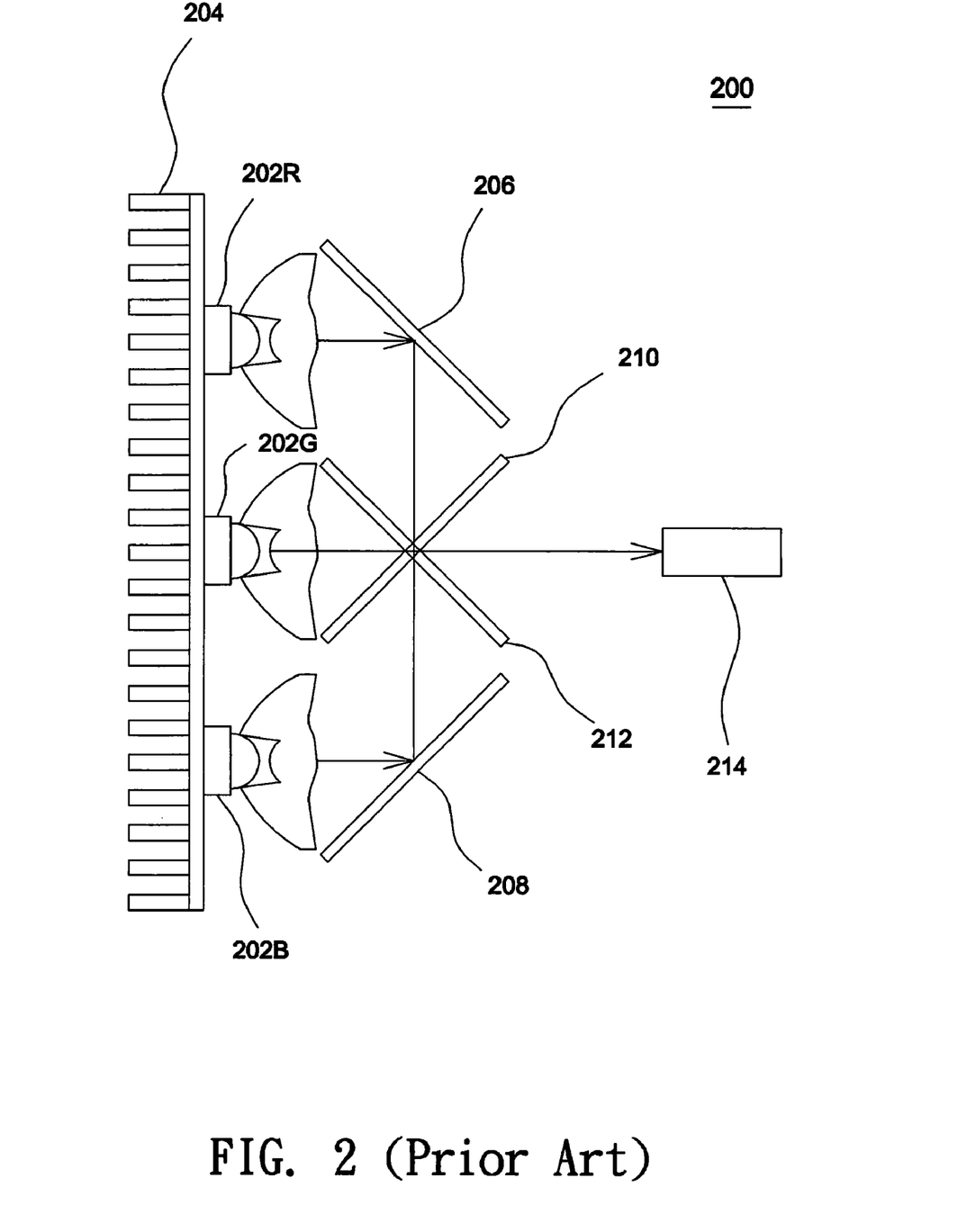
FIG. 2 shows a schematic diagram illustrating another conventional illumination system.

FIG. 2 shows a schematic diagram illustrating another conventional illumination system that uses multiple light-emitting diodes as light sources. Referring to FIG. 2, a red LED 202R, a green LED 202G, and a blue LED 202B are provided on the same side of a single heat-dissipating element 204. The emitting light of the red LED 202R is reflected by a first reflective mirror 206, passes through a first dichroic mirror 210, reflected by a second dichroic mirror 212, and then enters a light integrator rod 214. The emitting light of the green LED 202G passes through the first dichroic mirror 210 and the second dichroic mirror 212 in succession and then enters the light integrator rod 214. The emitting light of the blue LED 202B is reflected by a second reflective mirror 208, passes through the second dichroic mirror 212, reflected by the first dichroic mirror 210 and then enters the light integrator rod 214. Though such optical configuration may achieve the effect of arranging all LEDs on a single heat-dissipating element 204, the vertical span of an illumination system 200 is lengthen to excessively expand the occupied space of a projection apparatus.

BRIEF SUMMARY OF THE INVENTION

The invention provides a projection apparatus and a light-mixing module each having reduced occupied space and capable of integrating multiple light sources into a single mount.

According to an embodiment of the invention, a projection apparatus includes a first, a second and a third light sources, a first reflective element, a first and a second dichroic mirrors, a light-homogenizing element, a light valve and a projection lens.

The first, the second and the third light sources respectively emit a first, a second and a third light beams. The first reflective element is configured to reflect the first light beam, and the first dichroic mirror is configured to reflect the second light beam and to transmit the first light beam transmitted from the first reflective element. The second dichroic mirror is configured to reflect the first and the second light beams transmitted from the first dichroic mirror and to transmit the third light beam, so that the first, the second and the third light beams are guided to an identical optical path to form a combined light beam. The first reflective element, the first dichroic mirror and the second dichroic mirror are arranged in parallel and spaced at intervals from each other. The light-homogenizing element is used for receiving and then homogenizing the combined light beam, and the light valve is used for receiving and then modulating the combined light beam to form an image beam. The projection lens is used for receiving and then projecting the image beam.

According to the above embodiment, a simplified configuration that is allowed to carry all light sources on a single heat-dissipating mount is achieved, and the simplified configuration may reduce the occupied spaces of the light-mixing module and the projection apparatus.

In one embodiment, the projection apparatus further includes a second reflective element used for reflecting the combined light beam transmitted from the second dichroic mirror so as to change the optical path of the combined light beam. Thus, the light-homogenizing element and the light-mixing module are allowed to be respectively placed in two distinct rows of optics to further reduce the occupied space of the projection apparatus.

In one embodiment, the first reflective element and the first and the second dichroic mirrors are formed in a prism, and the angles formed between them and a light-receiving surface of the prism is set as smaller than 45 degrees to reduce the thickness of the prism.

In one embodiment, the first reflective element, the first dichroic mirror and the second dichroic mirror are respectively formed in a first, a second and a third prisms that are arranged side by side and separated from each other by a gap. A first angle is formed between the first reflective element and a light-receiving surface of the first prism, a second angle is formed between the first dichroic mirror and a light-receiving surface of the second prism, a third angle is formed between the second dichroic mirror and a light-receiving surface of the third prism, and the first, the second and the third angles are each smaller than 45 degrees.

In one embodiment, the prism is made of borosilicate glass (BK-7 glass), a first angle is formed between the first reflective element and a light-receiving surface of the first prism, a second angle is formed between the first dichroic mirror and a light-receiving surface of the second prism, a third angle is formed between the second dichroic mirror and a light-receiving surface of the third prism, and the first, the second and the third angles are each in the range of not less then 28 degrees and smaller than 45 degrees.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and variations thereof herein are used broadly and encompass direct and indirect connections, couplings, and mountings. Similarly, "adjacent to" and variations thereof herein are used broadly and encompass directly and indirectly "adjacent to". Therefore, the description of "A" component "adjacent to" "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 3:
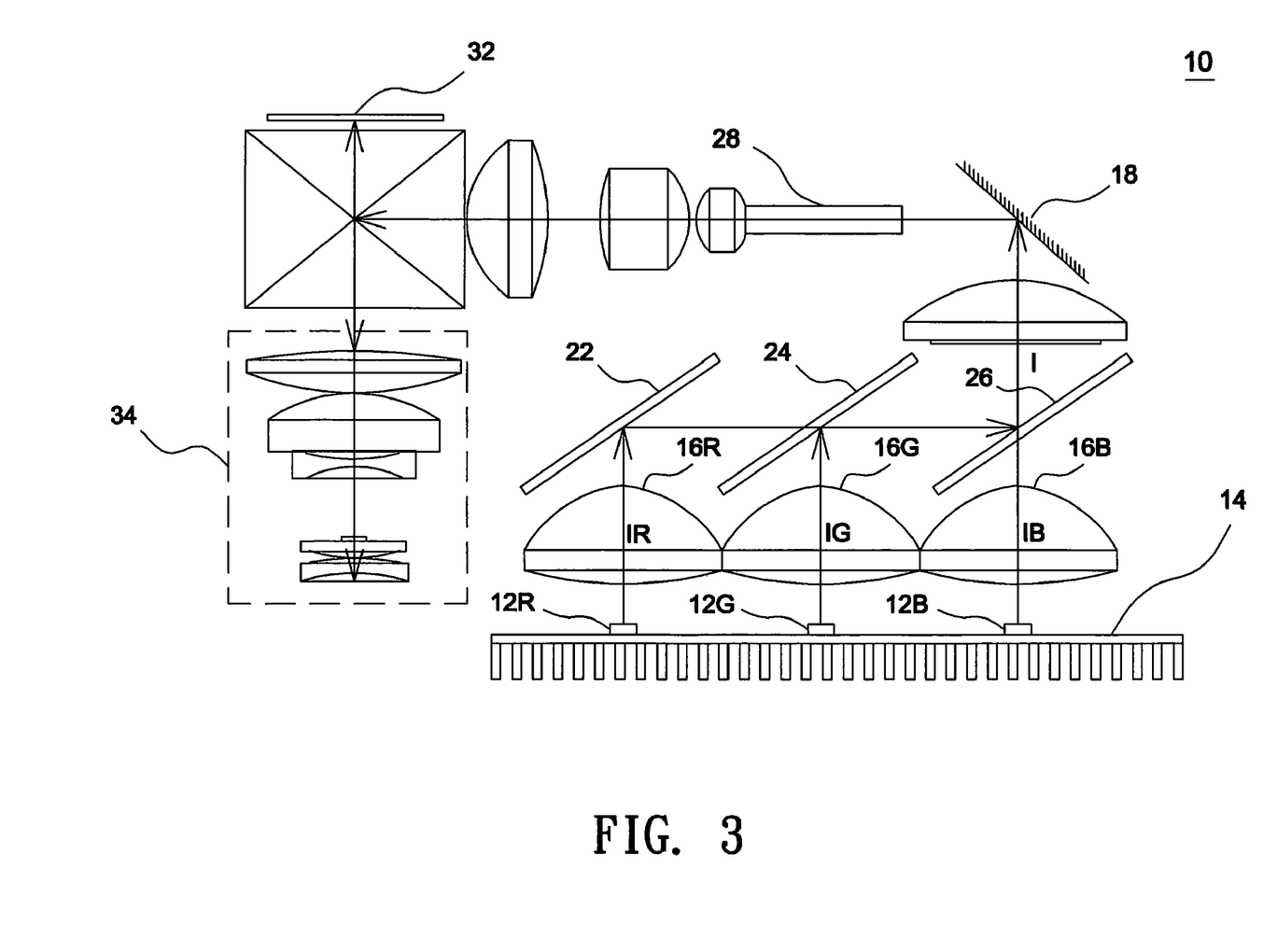
FIG. 3 shows a schematic diagram illustrating a projection apparatus according to an embodiment of the invention.

FIG. 3 shows a schematic diagram illustrating a projection apparatus 10 according to an embodiment of the invention. Referring to FIG. 3, a red LED 12R, a green LED 12G, and a blue LED 12B are arranged on the same side of a heat-dissipating element 14. The heat-dissipating element 14 may be a heat sink with an enhanced-heat-transfer mechanism, a heat pipe, or a heat-dissipating mount with a fan. Further, three collimator lenses 16R, 16G and 16B are respectively positioned at the light-emitting sides of the red LED 12R, green LED 12G and blue LED 12B to collimate light beams emitted from all LEDs before they enter a light-mixing module.

In this embodiment, the light-mixing module includes a first reflective element 22, a first dichroic mirror 24, and a second dichroic mirror 26 that are arranged in parallel and spaced at intervals from each other. Also, the first reflective element 22, the first dichroic mirror 24, and the second dichroic mirror 26 are positioned corresponding to the red LED 12R, the green LED 12G and the blue LED 12B, respectively. The first reflective element 22 is simply configured to provide the function of reflecting light beams incident thereon. For example, it may be a reflective mirror having high reflectance, a dichroic mirror for filtering out specific wavelength bands of light, or a side surface of a prism that allows for total reflection of light.

Referring to FIG. 3, a red light beam IR, a green light beam IG and a blue light beam IB are incident on the first reflective element 22, the first dichroic mirror 24, and the second dichroic mirror 26, respectively, with their incident directions being parallel with each other. The first reflective element 22 reflects the red light beam IR, and the first dichroic mirror 24 reflects the green light beam IG and transmits the red light beam IR. The second dichroic mirror 26 reflects the red light beam IR and green light beam IG and transmits the blue light beam IB. Hence, the red light beam IR, the green light beam IG and the blue light beam IB are guided to an identical optical path by the light-mixing module to form a combined light beam I. Further, in one embodiment, the projection apparatus 10 may include a second reflective element 18 used for reflecting the combined light beam I transmitted from the second dichroic mirror 26, so that the combined light beam I may change its propagation, direction and enter a light integrator rod 28. For example, as shown in FIG. 3, the second reflective element 18 and the light integrator rod 28 are arranged into a row spaced apart from a row of the first reflective element 22, the first dichroic mirror 24, and the second dichroic mirror 26, and the combined light beam I reflected by the second reflective element 18 travels in a direction opposite to a propagation direction of the red light beam IR reflected by the first reflective element 22 and the green light beam IG reflected by the first dichroic mirror 24. A light valve 32 receives the combined light beam I homogenized by the light integrator rod 28 and then modulates the combined light beam to form an image beam, and a projection lens receives and then projects the image beam.

According to the above embodiment, since the red LED 12R, the green LED 12G and the blue LED 12B are arranged on the same side of a heat-dissipating element 14, a simplified configuration that is allowed to carry all LEDs on a single heat-dissipating element is achieved. Compared with the conventional design shown in FIG. 1, in the above embodiment a single heat-dissipating element rather than multiple ones is needed to carry all LEDs. Further, compared with the conventional design shown in FIG. 2, the above simplified configuration may decrease the number of constituting members for the same purpose of carrying all LEDs on a single heat-dissipating element, so that the occupied spaces of the light-mixing module and the projection apparatus are reduced. Besides, since the combined light beam I transmitted from the second dichroic mirror 26 is reflected by the second reflective element 18 to change its propagation direction before entering the light integrator rod 28, the light integrator rod 28 and the light-mixing module are allowed to be respectively placed in two distinct rows of optics to further reduce the occupied space of the projection apparatus 10.

In the above embodiment, the red LED 12R, the green LED 12G and the blue LED 12B are, from the left side to the right side, arranged in succession on one side of the heat-dissipating element 14; However, this is not limited. The first reflective element 22, the first dichroic mirror 24 and the second dichroic mirror 26 are simply used to respectively change the paths of a first, a second and a third light beams, and each of the first, the second and the third light beams are not limited to a specific color. Further, except for the light-emitting diode exemplified in the above embodiment, other light sources such as semiconductor laser may also be used in the projection apparatus 10.

Figure 4:
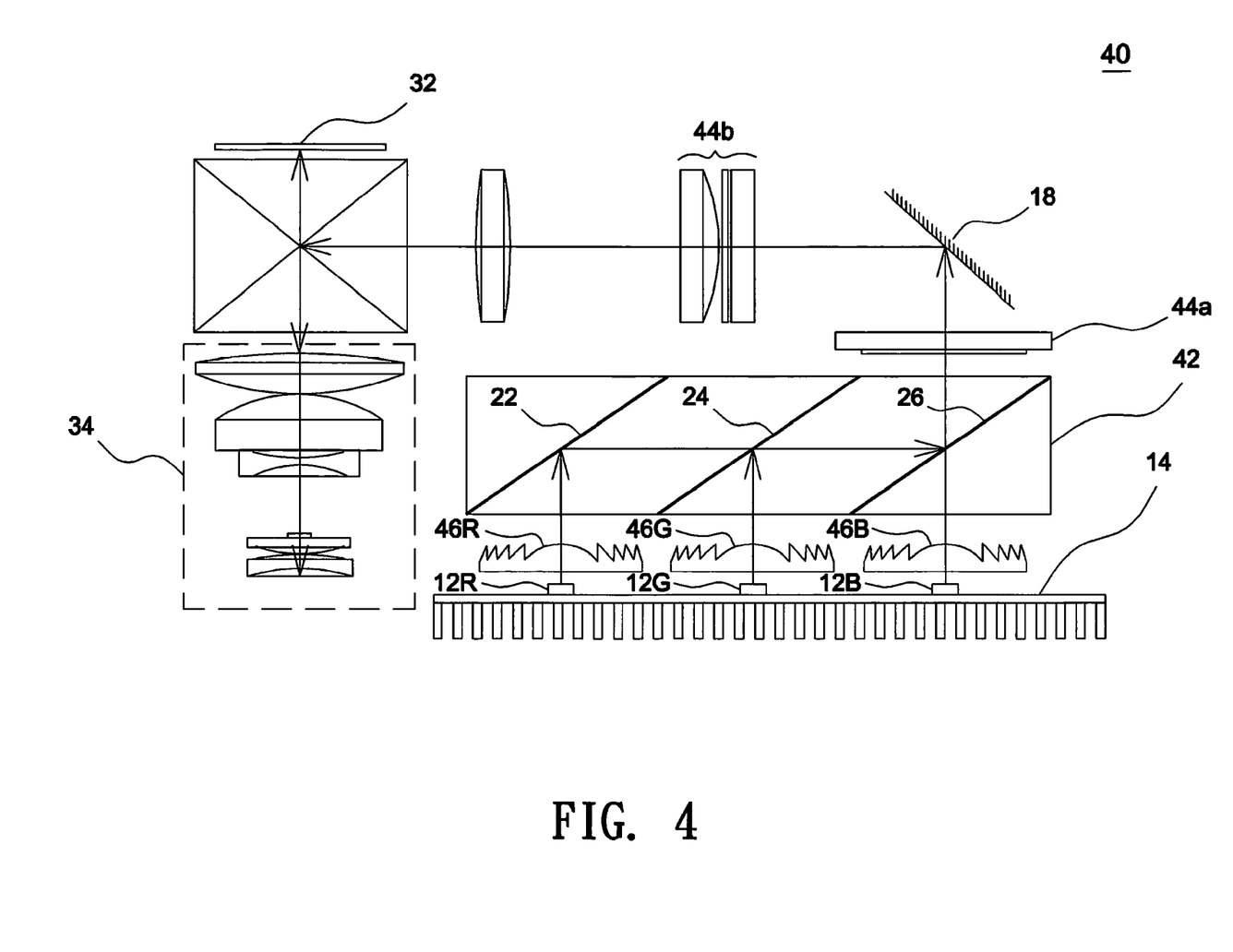
FIG. 4 shows a schematic diagram of a projection apparatus according to another embodiment of the invention.

FIG. 4 shows a schematic diagram of a projection apparatus 40 according to another embodiment of the invention. Referring to FIG. 4, The first reflective element 22, the first dichroic mirror 24 and the second dichroic mirror 26, which are arranged in parallel and spaced at intervals, are formed in a prism. In other words, the light-mixing module is a beam combiner prism 42. Also, a lens array 44a and 44b is used as a light-homogenizing element for homogenizing the combined light beam I, and Fresnel lenses 46R, 46G and 46B are used as a condensing element to collimate incoming light beams. Specially, Fresnel lens 46R is disposed between the first light source and the first reflective element 22, Fresnel lens 46G is disposed between the second light source and the first dichroic mirror 24, and Fresnel lens 46B is disposed between the third light source and the second dichroic mirror 26. Certainly, the condensing element is not limited to a specific kind; for example, a diffraction optic may also be used.

Figure 5A:
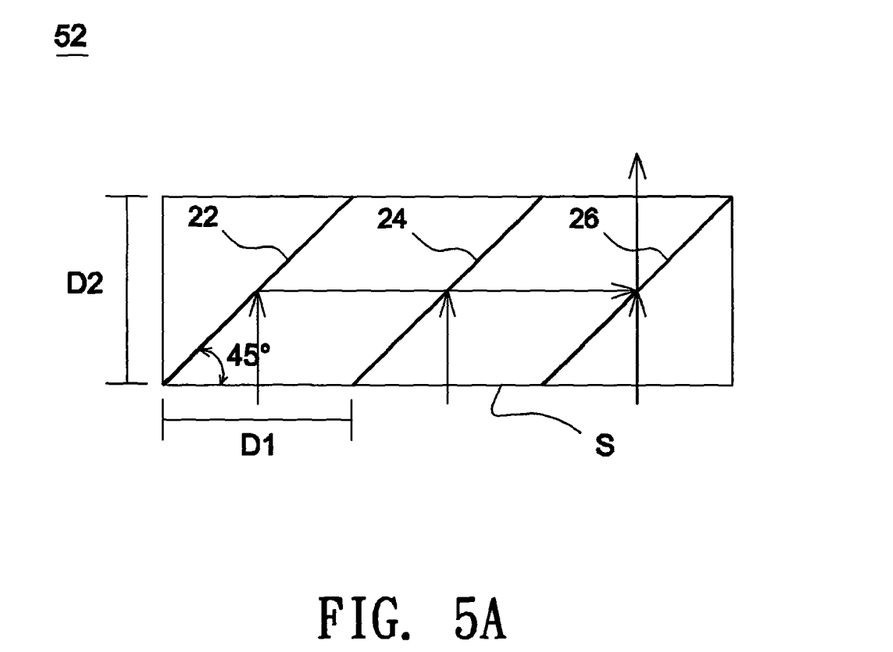
FIGS. 5A and 5B are schematic diagrams illustrating the design for reducing the overall thickness of a light-mixing module according to an embodiment of the invention.
Figure 5B:
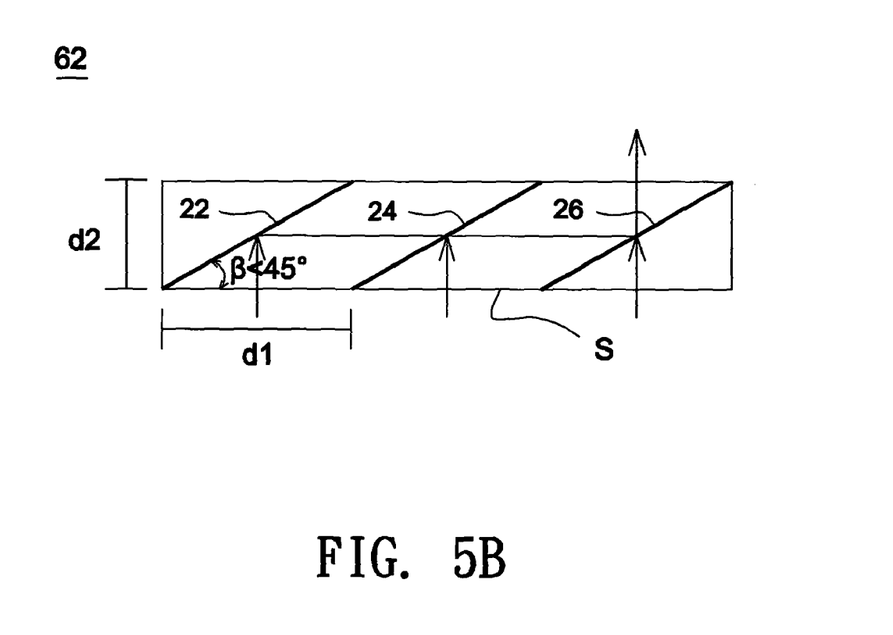

FIGS. 5A and 5B are schematic diagrams illustrating the design for reducing the overall thickness of a light-mixing module according to an embodiment of the invention. Referring to FIG. 5A, the light-mixing module is a beam combiner prism 52. As the three included angles between a light-receiving surface S of the beam combiner prism 52 and the first reflective element 22, the first dichroic mirror 24 and the second dichroic mirror 26 are all equal to 45 degrees, the incident angles formed by incoming light beams incident on the first reflective element 22, the first dichroic mirror 24 and the second dichroic mirror 26 are also equal to 45 degrees. In that case, a characterized length D1 of an effective light incident plane is equal to the thickness D2 of the beam combiner prism 52. On the other hand, as shown in FIG. 5B, in case the included angles β between the light-receiving surface S and the first reflective element 22, the first dichroic mirror 24 and the second dichroic mirror 26 are set as smaller than 45 degrees, the thickness d2 of the beam combiner prism 52 becomes smaller than a characterized length d1 of an effective light incident plane. Hence, under the same characterized length of an effective light incident plane, that the included angle β is set as smaller than 45 degrees may effectively reduce the thickness as well as the occupied space of a beam combiner prism. According to the results obtained from actual simulation, in case the characterized length of an effective light incident plane is set as 20 mm and the included angle β is 30 degrees, the thickness of a beam combiner prism is reduced by 8.5 mm, with only a slight decrease in luminous efficiency of 0.1% occurring when compared with another beam combiner prism having an included angle β of 45 degrees.

Figure 6A:
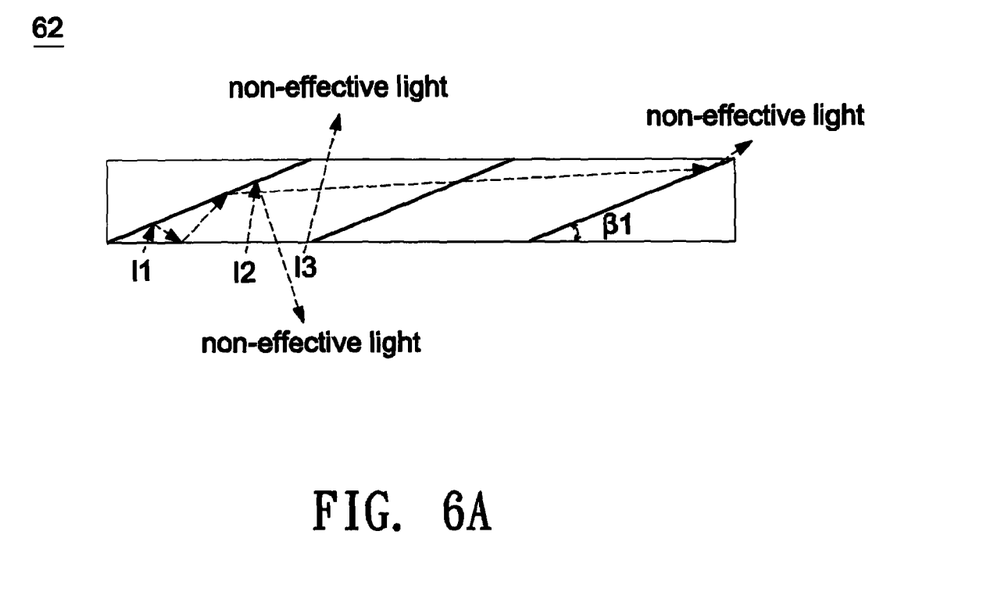
FIGS. 6A and 6B are schematic diagrams illustrating the relationship between energy loss and the included angles of the light-receiving surface of a beam combiner prism in relation to other optics.
Figure 6B:
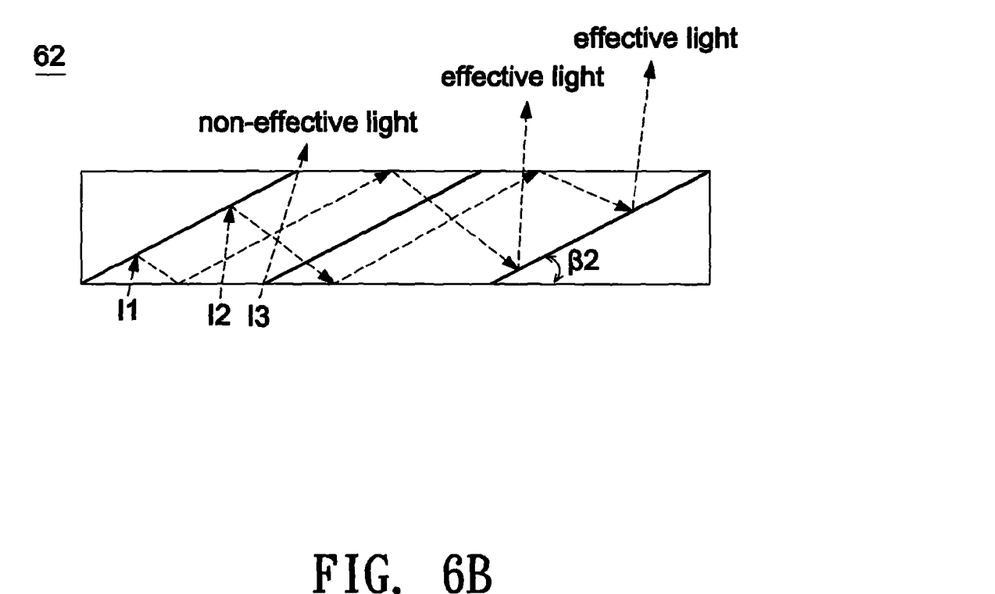

FIGS. 6A and 6B are schematic diagrams illustrating the relationship between energy loss and the included angles of the light-receiving surface S of a beam combiner prism in relation to other optics. Particularly, under the condition where the included angles between the light-receiving surface S and the first reflective element 22, the first dichroic mirror 24 and the second dichroic mirror 26 are all smaller than 45 degrees, the energy loss increases as the included angle is reduced. Also, the included angle β1 shown in FIG. 6A is exemplified as smaller than the included angle β2 shown in FIG. 6B. FIG. 6A shows different conditions of energy loss where the included angle β1 is far small. For example, the incoming light beam I1 reflected several times in the beam combiner prism 62 may exit from the beam combiner prism 62 at an improper angle to cause energy loss. Alternatively, the incoming light beam I2 reflected by the reflective element 22, dichroic mirror 24 or dichroic mirror 26 may not be totally reflected on the bottom of the beam combiner prism 62 and thus not return to the beam combiner prism 62 to cause energy loss. Besides, the incoming light beam I3 that is not reflected by the reflective element 22 and directly passes through the beam combiner prism 62 also causes energy loss. In comparison, in case the included angle is increased (such as the included angle β2) as shown in FIG. 6B, the incoming light beams I1 and I2 reflected by the reflective element 22 that has an enlarged angle in relation to the bottom of the beam combiner prism 62 are guided out at a proper exit angle to become effective light, thus reducing the energy loss. In other words, in case the included angles between the light-receiving surface S and the first reflective element 22, the first dichroic mirror 24 and the second dichroic mirror 26 are set as smaller than 45 degrees to reduce the overall thickness, the value of the included angles may be further optimized to avoid energy loss, where some factors such as materials of a prism or incident angles of incoming light beams are taken into considerations. For example, in case the prism is made of borosilicate glass (BK-7 glass), the energy loss is considerably decreased when the included angle β is increased from 27 degrees to 28 degrees, according to the results obtained from actual simulation. Hence, as for BK-7 glass, a preferred range of the included angle β3 is set as not less than 28 degrees and smaller than 45 degrees. Certainly, the lower limit of the included angle β (such as 28 degrees for BK-7 glass) may be determined according to the selection of prism materials to achieve a compromise between the reduction of prism thickness and the reduction of energy loss.

Figure 7:
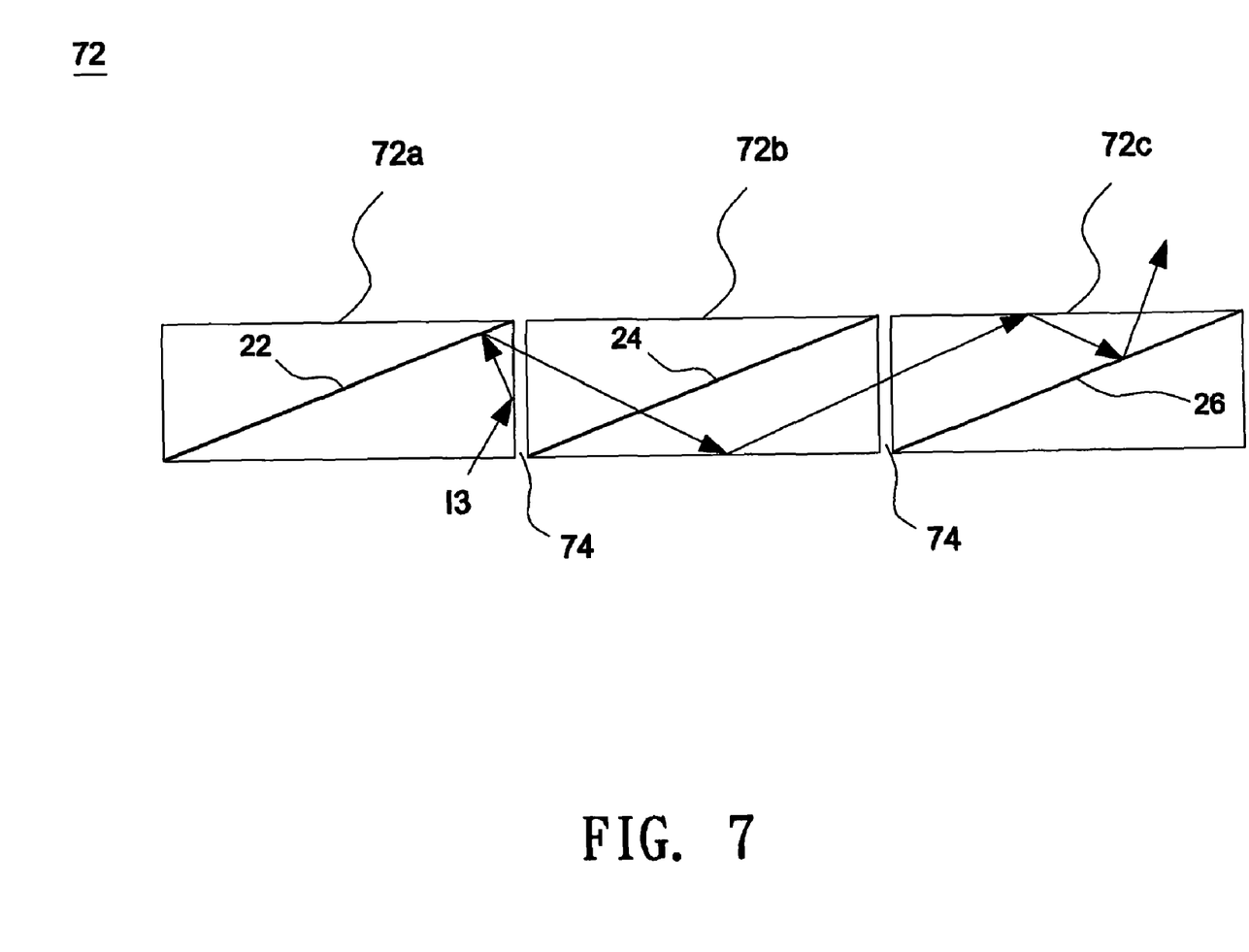
FIG. 7 shows a schematic diagram of a beam combiner prism according to another embodiment of the invention.

Further, referring to FIG. 7, in one embodiment the beam combiner prism 72 includes multiple sub prisms 72a, 72b and 72c that have the same number as the light sources (not shown) and are arranged side by side. The first reflective element 22, the first dichroic mirror 24, and the second dichroic mirror are respectively formed in the sub prisms 72a, 72b and 72c, and the sub prisms 72a, 72b and 72c are separated from each other by a gap 74. The gap 74 is preferably filled with air; alternatively, the gap 74 may be filled with a light-transmitting material having a refractive index smaller than that of the beam combiner prism 72. If the refractive index of the gap 74 is ng, the refractive index of the beam combiner prism 72 is np, and the incident angle of a incoming light beam I3 is θ, total reflection occurs conforming to Snell's law at the interface of the gap 74 and the beam combiner prism 72 as the following condition is met: ng $\geq$ np$\times$sin($\theta$). Hence, when the incoming light beam I3, presetting to have an incident angle to achieve total reflection, is incident on the interface of the sub prism 72a and the gap 74, the incoming light beam I3 is first totally reflected and then reflected by the first reflective element 22 to become effective light to avoid the energy loss illustrating in FIG. 6A or FIG. 6B, where the incoming light beam I3 is not incident on the first reflective element 22 and directly passes through the beam combiner prism 72.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
    a first, a second and a third light sources for respectively emitting a first, a second and a third light beams having respective colors and optical paths;
    a first reflective element configured to reflect the first light beam;
    a first dichroic mirror configured to reflect the second light beam and to transmit the first light beam transmitted from the first reflective element;
    a second dichroic mirror configured to reflect the first and the second light beams transmitted from the first dichroic mirror and to transmit the third light beam, so that the first, the second and the third light beams are guided to an identical optical path to form a combined light beam, wherein the first reflective element, the first dichroic mirror and the second dichroic mirror are arranged into a first row, in parallel and spaced at intervals from each other;
    a light-homogenizing element for receiving and then homogenizing the combined light beam;
    a second reflective element for reflecting the combined light beam transmitted from the second dichroic mirror, wherein the second reflective element and the light-homogenizing element are arranged into a second row spaced apart from the first row, and the combined light beam reflected by the second reflective element travels in a direction opposite to a propagation direction of the first light beam reflected by the first reflective element and the second light beam reflected by the first dichroic mirror;
    a light valve for receiving and then modulating the combined light beam to form an image beam; and
    a projection lens for receiving and then projecting the image beam,
    wherein the first reflective element and the first and the second dichroic mirrors are formed in a prism made of borosilicate glass and the prism has a light-receiving surface, the first, the second and the third light beams are incident on the light-receiving surface, and
    a first angle is formed between the first reflective element and the light-receiving surface, a second angle is formed between the first dichroic mirror and the light-receiving surface, a third angle is formed between the second dichroic mirror and the light-receiving surface, and the first the second and the third angles are each in the range of not less then than 28 degrees and smaller than 45 degrees.

2. The projection apparatus as claimed in claim 1, wherein the first light beam is incident on the first reflective element in a first incident direction, the second light beam is incident on the first dichroic mirror in a second incident direction, the third light beam is incident on the second dichroic mirror in a third incident direction, and the first, the second and the third incident directions are substantially parallel with each other.

3. The projection apparatus as claimed in claim 1, wherein the first reflective element comprises a third dichroic mirror configured to reflect the first light beam.

4. The projection apparatus as claimed in claim 1, further comprising:
    a heat-dissipating element, wherein the first, the second and the third light sources are arranged on a same side of the heat-dissipating element and spaced at intervals from each other.

5. The projection apparatus as claimed in claim 1, wherein the first, the second and the third light sources respectively comprise a light-emitting diode or a semiconductor laser.

6. The projection apparatus as claimed in claim 1, wherein the light-homogenizing element comprises a light integrator rod or a lens array.

7. The projection apparatus as claimed in claim 1, further comprising:
    a first condensing element disposed between the first light source and the first reflective element;
    a second condensing element disposed between the second light source and the first dichroic mirror; and
    a third condensing element disposed between the third light source and the second dichroic mirror.

8. The projection apparatus as claimed in claim 7, wherein the first, the second and the third condensing elements respectively comprise a collimator lens, a diffraction optic, or a Fresnel lens.

9. A projection apparatus, comprising:
    a first, a second and a third light sources for respectively emitting a first, a second and a third light beams having respective colors and optical paths;
    a first reflective element configured to reflect the first light beam;
    a first dichroic mirror configured to reflect the second light beam and to transmit the first light beam transmitted from the first reflective element;
    a second dichroic mirror configured to reflect the first and the second light beams transmitted from the first dichroic mirror and to transmit the third light beam, so that the first, the second and the third light beams are guided to an identical optical path to form a combined light beam, wherein the first reflective element, the first dichroic mirror, and the second dichroic mirror are arranged into a first row, in parallel and spaced at intervals from each other;

a light-homogenizing element for receiving and then homogenizing the combined light beam;

a second reflective element for reflecting the combined light beam transmitted from the second dichroic mirror, wherein the second reflective element and the light-homogenizing element are arranged into a second row spaced apart from the first row, and the combined light beam reflected by the second reflective element travels in a direction opposite to a propagation direction of the first light beam reflected by the first reflective element and the second light beam reflected by the first dichroic mirror;

a light valve for receiving and then modulating the combined light beam to form an image beam; and a projection lens for receiving and then projecting the image beam, wherein the first reflective element, the first dichroic mirror and the second dichroic mirror are respectively formed in a first, a second and a third prisms that are arranged side by side and separated from each other by a gap.

10. The projection apparatus as claimed in claim 9, wherein the first, the second and the third prisms are made of borosilicate glass, a first angle is formed between the first reflective element and a light-receiving surface of the first prism, a second angle is formed between the first dichroic mirror and a light-receiving surface of the second prism, a third angle is formed between the second dichroic mirror and a light-receiving surface of the third prism, and the first, the second and the third angles are each in the range of not less then than 28 degrees and smaller than 45 degrees.

11. The projection apparatus as claimed in claim 9, further comprising:

a first condensing element disposed between the first light source and the first reflective element;

a second condensing element disposed between the second light source and the first dichroic mirror; and a third condensing element disposed between the third light source and the second dichroic mirror.

12. The projection apparatus as claimed in claim 11, wherein the first, the second and the third condensing elements respectively comprise a collimator lens, a diffraction optic, or a Fresnel lens.

* * * * *